United States Patent [19]

Yamaguchi et al.

[11] 4,171,406
[45] Oct. 16, 1979

[54] MAGNETIC RECORDING MEDIUM

[75] Inventors: Nobutaka Yamaguchi, Odawara; Masahiro Utumi, Odawara; Masaaki Fujiyama, Odawara; Masakazu Yoneyama, Minami-ashigara, all of Japan

[73] Assignee: Fuji Photo Film Co., Ltd., Minami-ashigara, Japan

[21] Appl. No.: 922,413

[22] Filed: Jul. 6, 1978

[30] Foreign Application Priority Data

Jul. 6, 1977 [JP] Japan .................................. 52-80780

[51] Int. Cl.$^2$ ............................................. H01F 10/02
[52] U.S. Cl. .................................... 428/447; 428/539; 428/900
[58] Field of Search ...................... 428/900, 447, 539; 427/127-132, 48; 252/62, 54

[56] References Cited

U.S. PATENT DOCUMENTS

| 4,005,242 | 1/1977 | Kopke et al. ................... 428/900 |
| 4,007,313 | 2/1977 | Higuchi et al. ................ 428/900 |
| 4,007,314 | 2/1977 | Higuchi et al. ................ 428/900 |

*Primary Examiner*—Bernard D. Pianalto
*Attorney, Agent, or Firm*—Sughrue, Rothwell, Mion, Zinn and Macpeak

[57] ABSTRACT

A magnetic recording medium with a greatly reduced coefficient of friction comprising a non-magnetic support having thereon a magnetic recording layer comprising finely divided ferromagnetic powders in a binder, wherein
(1) at least one alkylpolysiloxane having a hydrophilic group in the side chain thereof and represented by the formula (I)

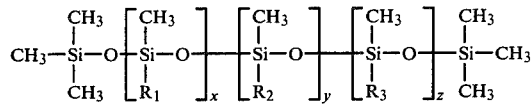

wherein $R_1$ and $R_2$, which may be the same or different, each represents

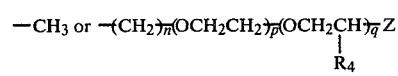

provided that $R_1$ and $R_2$ are not simultaneously —$CH_3$; $R_3$ represents —$CH_3$ or the aliphatic chain having 10 to 18 carbon atoms of a saturated or unsaturated fatty acid; $R_4$ represents —H or —$CH_3$; Z represents an ionic group, which renders the alkylpolysiloxane water-soluble, selected from the group consisting of —$OSO_3Na$, —$COOR_5$ wherein $R_5$ is H, Na or K, and

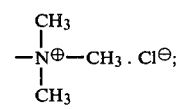

x represents a number of from 3 to 50; y represents a number of from 2 to 50; z represents 0 or a number of from 1 to 10; x+y+z is a number of from 5 to 100; n is 0 or a number of from 1 to 5; p is 0 or a number of from 1 to 50; and q is 0 or a number of from 1 to 50; is present in the magnetic recording layer in an amount of about 5 wt% or less based on the weight of the ferromagnetic powders and
(2) the magnetic layer has a Young's modulus of at least $1 \times 10^{10}$ dyne/cm$^2$.

9 Claims, No Drawings

MAGNETIC RECORDING MEDIUM

BACKGROUND OF THE INVENTION

1. Field of the Invention

The present invention relates to magnetic recording media such as video tapes, audio tapes, memory tapes, and the like.

2. Description of the Prior Art

Recording media such as tapes which are designed to be thin and where the speed of feeding the tape is designed to be slow, such as high density compact video tapes, are particularly effective due to the fact that the coefficient of friction on the base surface can be reduced without a broad reduction in the Young's modulus of the magnetic layers occurring.

The surface of the support opposite the magnetic layer in a magnetic tape can be divided into the following classes:

(1) tapes in which the support surface is exposed;
(2) tapes in which a back coating layer of carbon black is provided on the back support surface; and
(3) tapes in which a back coating layer of a solid lubricant such as graphite, molybdenum disulfide, etc. is provided on the back support surface.

Of these, tapes of type (3) above have the lowest coefficient of friction. However, even with tapes of type (3) above, (A) the solid lubricants described above are scraped off by repeated use thereof to thereby cause drop out (of the signals) of the magnetic tapes; and (B) the surface roughness of the back coating is transferred (printed through) onto the surface of the magnetic layer during storage of the magnetic tape, and particularly in the case of a high density tape, a serious deterioration in the high frequency signals as well as a serious increase in noise occur.

With tapes of type (2); the following technical problems are encountered:

(C) the coefficient of friction is not satisfactory since it is higher than in tapes of the type (3) while lower than in tapes of type (1);

(D) the same problem as in (B) above is encountered; and with tapes of type (1)

(E) the coefficient of friction is high so that scratching tends to occur and hence, scraped dust of the base due to the scratching adheres to the magnetic recording layer to thereby cause drop out to occur.

Of these problems, (B) and (D) most adversely affect high density tapes. The following methods are known to improve (A) above:

(A′) a method in which a base support having a low surface roughness at the surface adjacent a magnetic recording layer and having a high surface roughness at the surface opposite the magnetic recording layer is employed;

(A″) a method in which a lubricant is coated on the surface opposite the magnetic recording layer during the preparation of the base or the preparation of the magnetic tape; etc. However, even with these methods, the following disadvantages are still encountered:

in (A′), this kind of base support has not been popularized yet in general and hence the cost is expensive; and in (A″), a reduction in the coefficient of friction is effectively facilitated immediately after coating, but the effect in the reduction of the coefficient of friction disappears with the passage of time; etc.

In addition, tapes of types (2) and (3) mentioned above have the following disadvantages, as compared to the tapes of type (1);

(a) due to the presence of a backing layer, extra expense for raw materials as well as preparation of a coating solution thereof are incurred; and (b) due to the double coatings required to coat a magnetic recording layer and to coat a backing layer, the yield rate is naturally decreased as compared to that of the single coating of a magnetic recording layer; etc. Further, use of method (A″) has the disadvantage of (a) above.

On the other hand, a variety of methods of incorporating lubricants such as higher fatty acids, higher fatty acid esters, paraffin type hydrocarbons, silicone oils (e.g., dimethyl polysiloxane, diphenyl polysiloxane, etc.), or the like into magnetic recording layers have been studied and examined. In particular, silicone oils are preferably employed as lubricants due to the good results obtained.

The above-described additives are disclosed in Japanese Patent Publication Nos. 18064/66, 186/68, 669/68, 15624/72, 14249/74, and 14252/74; Japanese Patent Application (OPI) Nos. 32904/75, 99701/75, 13210/75 and 40903/76 (The term "OPI" as used herein refers to a "published unexamined Japanese patent application".); U.S. Pat. Nos. 2,654,681, 3,470,021, 3,497,411, 3,525,694, and 3,634,253, etc.

However, sufficient lubrication and durability cannot be successfully achieved for the back surface of the support of video tapes using these conventional additives.

Further, when coated as a backing layer as in method (A″) above, only a trace of the lubricants ultimately remains on the surface of the base support of a tape after it has been passed through the various steps subsequent to coating. Furthermore, even the trace of lubricants is transferred into a magnetic layer with the passage of time if the tape is allowed to stand so that the coefficient of friction of the base surface increases. Even when tapes are repeatedly used in a VTR, the coefficient of friction also increases.

To the contrary, if the lubricant in accordance with the present invention is incorporated into a magnetic layer, a low constant coefficient of friction is always maintained. The reason for this is believed because, if the lubricant exuded from the magnetic recording layer is once adhered to the base surface, an equilibrium state between exudation and removal of lubricant is maintained even if allowed to stand for a long period of time. In addition, it is also assumed because, even if the amount of lubricant on the base surface and the surface of the magnetic recording layer is temporarily reduced or removed by running tapes in a VTR, the lubricant exudes from the magnetic recording layer immediately when the tapes are wound up, and adheres to the base surface.

Conventionally known lubricants which are generally incorporated in magnetic layers have little effect of decreasing the coefficient of friction of the base surface. In addition, in order to enhance the effect, a large amount of lubricants should be incorporated into the magnetic recording layers, but this is not preferred because a reduction in the elasticity of the magnetic recording layers occurs.

On the other hand, higher density recording is desired for magnetic recording tapes, particularly for video tapes, and due to improvements in the efficiencies of magnetic recording layers, recording wavelengths have been changed from 6 μm to 1 μm, and the running speed of tapes has been reduced from 38 cm/sec. to 3.33 cm/sec. In addition, due to high density recording signal requirements, any changes which occur due to tension, temperature, friction, etc. cannot be ignored.

For example, comparing a tape with a running speed of 38 cm/sec. and a recording wavelength of 4 μm with a tape with a running speed of 3.33 cm/sec and a recording wavelength of 1 μm, (i) the surface property of the latter tape should be improved, so that "stick-slip" of the tape tends to occur; and (ii) an unevenness in the running of the latter tape tends to occur.

On the other hand, now the tendency is to convert high density compact video tapes into cassette tapes. With the conversion of cassettes into smaller-sized cassettes and of VTR tapes to a small size, an extremely marked characteristic is to reduce the thickness of the tape. As a result, the mechanical strength of the tape is weak so that the shape of the tapes tends to change and the tape has poor quality. The mechanical strength of a tape is proportional to the cube of the Young's modulus. A base having a high Young's modulus, e.g., an Al-deposited base, can be used, but this approach has not been employed practically yet due to economic considerations and other problems. As a result, reduction in the Young's modulus of the magnetic recording layer is not desired.

SUMMARY OF THE INVENTION

An object of the present invention is to eliminate all of the disadvantages above and to decrease the coefficient of friction of a magnetic tape where the tape is used at a tape running speed below 5 cm/sec., particularly below 4 cm/sec., and where no adverse effects accompany high frequency recording.

That is, the present invention provides a magnetic recording medium comprising a non-magnetic support having thereon a magnetic recording layer comprising finely divided ferromagnetic powders in a binder, wherein (1) at least one alkyl polysiloxane, having a hydrophilic group in the side chain thereof, represented by the general formula (I) below $$CH_3-\underset{\underset{CH_3}{|}}{\overset{\overset{CH_3}{|}}{Si}}-O\left[\underset{\underset{R_1}{|}}{\overset{\overset{CH_3}{|}}{Si}}-O\right]_x\left[\underset{\underset{R_2}{|}}{\overset{\overset{CH_3}{|}}{Si}}-O\right]_y\left[\underset{\underset{R_3}{|}}{\overset{\overset{CH_3}{|}}{Si}}-O\right]_z\underset{\underset{CH_3}{|}}{\overset{\overset{CH_3}{|}}{Si}}-CH_3 \quad (I)$$

wherein $R_1$ and $R_2$, which may be the same or different, each represents

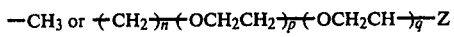

provided that $R_1$ and $R_2$ are not simultaneously —$CH_3$; $R_3$ represents —$CH_3$ or the aliphatic chain having 10 to 18 carbon atoms of a saturated or unsaturated fatty acid; $R_4$ represents —H or —$CH_3$; Z represents an ionic group, which renders the alkylpolysiloxane water-soluble, selected from the group consisting of —$OSO_3Na$, —$COOR_5$ wherein $R_5$ is H, Na or K, and

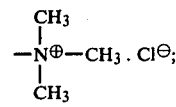

x represents a number of from 3 to 50, preferably 5 to 30; y represents a number of from 2 to 50, preferably 4 to 30; z is 0 or a number of from 1 to 10, preferably 0 or 1 to 5; x+y+z is a number of from 5 to 100, preferably 5 to 50; n is 0 or a number of from 1 to 5, preferably 0 or 1 to 3; p is 0 or a number of from 1 to 50, preferably 1 to 20; and q is 0 or a number of from 1 to 50, preferably 1 to 10; is present in the magnetic recording layer in an amount of about 5 wt% or less based on the weight of the finely divided ferromagnetic powders and (2) the Young's modulus of the magnetic recording layer is at least $1 \times 10^{10}$ dyne/cm$^2$.

The hydrophilic group present in the side chain of the alkylpolysiloxane used in the present invention is a hydrophilic alkylene group (i.e., where p and q both are 0) or a hydrophilic polyoxyalkylene chain.

DETAILED DESCRIPTION OF THE INVENTION

Suitable examples of aliphatic chains having 10 to 18 carbon atoms of saturated or unsaturated fatty acids, i.e., the alkyl or alkenyl group thereof, for $R_3$ are as follows (with the fatty acid acyl group from which these aliphatic chains are derived being included in parenthesis): for example, decyl(n-undecanoyl), undecyl(lauryl or n-dodecanoyl), dodecyl(n-tridecanoyl), tridecyl(myristyl or n-tetradecanoyl), tetradecyl(n-pentadecanoyl), pentadecyl (palmityl or n-hexadecanoyl), hexadecyl(margaryl or n-hepatadecanoyl), heptadecyl(stearyl or n-octadecanoyl), 8-undecenyl(lauroleyl or 9-dodecenoyl), 3-tridecenyl(4-tetradecenoyl), 4-tridecenyl(5-tetradecenoyl), 8-pentadecenyl(zoomaryl or 9-hexadecenoyl), 5-heptadecenyl (petrocelinyl or 6-octadecenoyl), 8-cis-heptadecenyl(oleyl or 9-cis-octadecenoyl), 8-trans-heptadecenyl(elaidyl or 9-trans-octadecenoyl), 10-heptadecenyl(vaccenyl or 11-octadecenyl), 8,11-heptadecadienyl(linoleinyl or 9,12-octadecadienoyl), 8,10,12-heptadecatrienyl(eleostearyl or 9,11,13-octadecatrienoyl), 8,11,14-heptadecatrienyl(linolenyl or 9,12,15-octadecatrienoyl), 8,10,12,14-heptadecatetraenyl(parinaryl or 9,11,13,15-octadecatetraenoyl), etc.

Specific examples of the compounds represented by the formula (I) described above are shown below.

(I - 1)

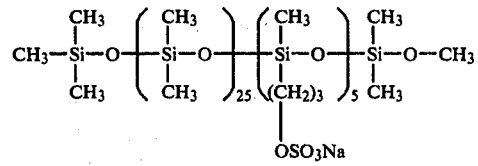

(I - 2)

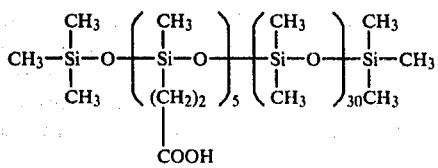

-continued (I-3)

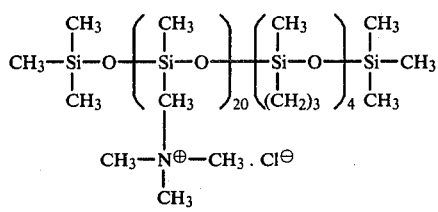

(I-4)

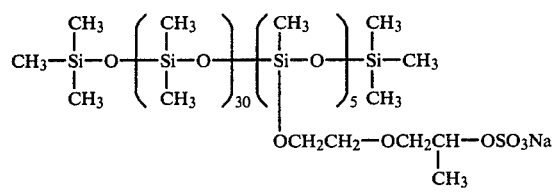

(I-5)

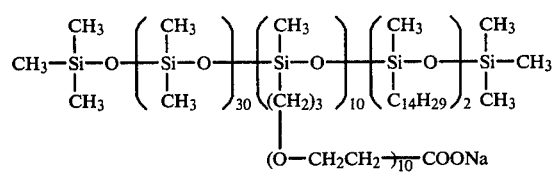

Processes for preparing the compounds used in the present invention represented by the formula (I) are known and are described in, for example, F. G. A. Stone and W. A. G. Graham, *Inorganic Polymers*, pages 230–231, Academic Press, (1962), W. Noll, *Chemistry and Technology of Silicones*, pages 209–211, Academic Press, (1968), P. F. Bruins, *Silicone Technology*, pages 64–66, John Wiley & Sons (1970), J. P. Kennedy et al., *High Polymers*, vol. 23, part 2, pages 773–775, etc. More specifically, the compounds of the formula (I) can be synthesized in accordance with the method for hydrolyzing organochlorosilanes as described in, e.g., Japanese Patent Publication No. 22361/61; by an addition reaction of SiH group-containing siloxanes to olefins in the presence of a metal catalyst as described in, e.g., Japanese Patent Publication Nos. 10771/60, 28694/68 and 14898/70, etc.; by the method described in U.S. Pat. No. 2,917,480; by the method described in *Ind. & Eng Chem. Prod. Res. & Dev.*, vol. 6, No. 2, page 88 (1967); by the methods described in *Kagaku to Kogyo* (*Chemistry & Industry*), vol. 19, page 147 (1966) and *Kogyo Kagaku Zasshi* (*J. Chem. Eng.*), vol. 73, page 78 (1970); by the methods for synthesizing polyorgano-siloxanes containing polyethylene oxide as described in British Pat. No. 916,561, French Pat. No. 1,353,669, etc.

The viscosity of the compounds represented by the formula (I) which are employed in accordance with the present invention is not limited and any viscosities can result in desired effects as far as they can be synthesized by the above-described methods. However, a suitable viscosity measured at 25° C. is about 20 to about 100,000 centistokes in general.

It is preferred that the compounds of the formula (I) employed in accordance with the present invention be present in the magnetic recording layer in an amount of about 5 wt% or less, more preferably 0.1 to 5 wt%, most preferably 0.1 to 2 wt% based on the weight of the ferromagnetic powders present. If the amount of the compound of the formula (I) is a larger than above amount, the reduction in the Young's modulus is marked, and the surface of the magnetic recording layer appears tacky and blocking occurs, which is unsuitable for a magnetic recording medium. In addition, the Young's modulus of the magnetic recording layer is $1 \times 10^{10}$ dyne/cm$^2$ or more when the compounds of the formula (I) are present in the magnetic recording layer in an amount of 5 wt%, and $2 \times 10^{10}$ dyne/cm$^2$ with 2 wt% of the compounds of the formula (I), according to the usual plans for magnetic recording tapes in which the most advantageous effects of the present invention are obtained, and which are particularly effective for magnetic tapes having a tape speed of lower than 5 cm/sec. This is believed to be because the ionic groups which render the compound water-soluble (substituent Z) are substituted on the hydrophilic alkylene group and the hydrophilic polyoxyalkylene chain in the formula (I).

The magnetic recording layer as used in this invention has a Young's modulus of $1 \times 10^{10}$ dyne/cm$^2$ or higher, and can be prepared by mixing ferromagnetic powders with a binder followed by coating such on a support.

Magnetic recording layers with a Young's modulus in this range can be produced using the following methods, e.g., (Method 1)

By using ferromagnetic powders having an increased acicular ratio and particle length, for example, an acicular ratio of 5:1 or more and a particle length of 0.2 μm or more;

(Method 2)

By changing the ratio by weight of the ferromagnetic powders to the binder, and other additives, that is, in general, by decreasing the ratio of ferromagnetic powders to the binder, and decreasing the amount of other additives present, for example, controlling the composition to a composition as follows:

| | |
|---|---|
| Ferromagnetic Powders | 100 parts |
| Binder | from 10 to 80 parts |
| Carbon Black (as an additive) | less than 20 parts |
| Lubricants, Plasticizers Abrasives, and Other Additives | less than 7 parts; | and (Method 3)

By increasing the orientation ratio, $$\frac{(Br/Bm)^{(\shortparallel)}}{(Br/Bm)^{(\perp)}},$$

wherein $(Br/Bm)^{(\shortparallel)}$ represents the squareness ratio in the longitudinal direction, and $(Br/Bm)^{(\perp)}$ represents the squareness ratio in the perpendicular direction to the longitudinal direction, for example, an orientation ratio of 1.2 or more.

(Method 1) to (Method 3) above are merely exemplary and it will be understood by one skilled in the art that the above compositions, ratios and methods can be varied.

The magnetic recording member of the present invention can be prepared by forming on a non-magnetic support a magnetic recording layer by coating onto the support a magnetic coating solution obtained by kneaddispersing finely divided ferromagnetic powders, binders and the alkylpolysiloxanes represented by the formula (I) using organic solvents, followed by drying.

Processes for preparing magnetic recording layer coating solutions which can be employed in the present invention are described in great detail in Japanese Patent Publications Nos. 15/60, 26794/64, 186/68, 28043/72, 28045/72, 28046/72, 28048/72, 31445/72, 11162/73, 21331/73 and 33683/73, U.S.S.R. Pat. No. 308,033, etc. The magnetic recording layer coating solutions as described therein comprise finely divided ferromagnetic powders, binders and coating solvents as main components and, in addition, may further contain additives such as dispersing agents, lubricants, abrasives, antistatic agents, etc.

Typical examples of finely divided ferromagnetic powders which can be employed in the present invention are ferromagnetic iron oxides, ferromagnetic chromium dioxides, ferromagnetic alloy powders and the like.

Suitable ferromagnetic iron oxides are ferromagnetic iron oxides having an x value within the range of $1.33 \leq x \leq 1.50$ when the iron oxides are represented by the formula $FeO_x$, i.e., maghemite (gamma-$Fe_2O_3$, x=1.50), magnetite ($Fe_3O_4$, x=1.33) and the Bertholide compounds thereof ($FeO_x$, $1.33 < x < 1.50$). The x value described above is shown by the following relationship:

$$x = 1/200 \times [2 \times (\text{atomic \% of divalent iron ions}) + 3 \times (\text{atomic \% of trivalent iron ions})]$$

Divalent metals can be added to these ferromagnetic iron oxides. Typical examples of suitable divalent metals include Cr, Mn, Co. Ni, Cu, Zn and the like and such can be present in an amount of 0 to about 10 atomic % based on the iron oxides.

Suitable ferromagnetic chromium dioxides which can be employed are $CrO_2$ and $CrO_2$ to which metals such as Na, K, Ti, V, Mn, Fe, Co, Ni, Tc, Ru, Sn, Ce, Pb, etc., semiconductors such as P, Sb, Te, etc., or oxides of these metals are added in an amount of 0 to about 20 wt%.

A suitable acicular ratio of the ferromagnetic iron oxides and ferromagnetic chromium dioxides described above is about 2:1 to about 20:1, preferably 5:1 to 10:1, with an average length in the range between about 0.2 and about 2.0 μm, preferably 0.5 and 1.5 μm.

The ferromagnetic alloy powders described above comprise at least 75 wt% of the metal component, of which 80 wt% or more of the metal component is at least one ferromagnetic metal (i.e., Fe, Co, Ni, Fe-Co, Fe-Ni, Co-Ni or Co-Ni-Fe) and of which 20 wt% or less, preferably 0.5 to 5 wt%, is an element such as Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P, etc. Further, the ferromagnetic alloy powders may contain a small amount of water, hydroxides or oxides thereof.

The ferromagnetic alloy powders described above are acicular particles comprising a chain of 2 to 20 particles, each particle having a particle size of about 50 to about 1000 Å.

Specific examples thereof are described in Japanese Patent Publications Nos. 5515/61, 4825/64, 5009/64, 10307/64, 14090/69, 18372/70, 22062/72, 22513/72, 28466/71, 38755/71, 4286/72, 12422/72, 17284/72, 18509/72, 18573/72, and 39639/73, U.S. Pat. Nos. 3,026,215, 2,031,341, 3,100,194, 3,242,005 and 3,389,014, British Pat. Nos. 752,659, 782,762 and 1,007,323, French Pat. No. 1,107,654, German Patent Application (OLS) No. 1,281,334, etc.

Suitable binders which can be employed in the present invention are conventionally known thermoplastic resins, thermosetting resins or reactive resins, and mixtures thereof.

Preferred thermoplastic resins which can be used are those having a softening point of not greater than about 150° C., an average molecular weight of from about 10,000 to about 200,000 and a degree of polymerization of about 200 to about 2000. For example, vinyl chloride-vinyl acetate copolymers, vinyl chloride-vinylidene chloride copolymers, vinyl chloride-acrylonitrile copolymers, acrylic acid esters-acrylonitrile copolymers, acrylic acid ester-vinylidene chloride copolymers, acrylic acid ester-styrene copolymers, methacrylic acid ester-acrylonitrile copolymers, methacrylic acid ester-vinylidene chloride copolymers, methacrylic acid ester-styrene copolymers, urethane elastomers, polyvinyl fluorides, vinylidene chloride-acrylonitrile copolymers, butadiene-acrylonitrile copolymers, polyamide resins, polyvinyl butyrals, cellulose derivatives (cellulose acetate butyrate, cellulose diacetate, cellulose triacetate, cellulose propionate, nitrocellulose, etc.), styrene-butadiene copolymers, polyester resins, amino resins, a variety of synthetic rubber type thermoplastic resins (polybutadienes, polychloroprenes, polyisoprenes, styrene-butadiene copolymers, etc.) and mixtures thereof, and the like can be used.

Specific examples of these resins are described in Japanese Patent Publications Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72 and 27886/73, U.S. Pat. Nos. 3,144,352, 3,419,420, 3,499,789 and 3,713,887.

Suitable thermosetting resins or reactive resins have a molecular weight of not greater than about 200,000 as a coating solution and the molecular weight becomes, after coating and drying, infinite due to reactions, such as condensation, addition, etc. In addition, of these resins, resins which do not soften nor melt until the resins are thermally decomposed are preferred. Specifically, phenol-formaldehyde novolac resins, phenol-formaldehyde resole resins, phenol-furfural resins, xylene-formaldehyde resins, urea resins, melamine resins, drying oil-modified alkyd resins, phenolic resin-modified alkyl resins, maleic acid resin-modified alkyd resins, unsaturated polyester resins, epoxy resins and hardening agents (polyamines, acid anhydrides, polyamide resins and the like), isocyanate terminated polyether moisture hardenable type resins, isocyanate terminated polyether moisture hardenable type resins, polyisocyanate prepolymers (compounds having at least three isocyanate groups in one molecule, obtained by reacting diisocyanates and low molecular weight triols; trimers and tetramers of diisocyanates), polyisocyanate prepolymers and resins having an active hydrogen (polyester polyols, polyether polyols, acrylic acid copolymers, maleic acid copolymers, 2-hydroxyethyl methacrylate copolymers, p-hydroxystyrene copolymers, and others), and mixtures thereof, and the like can be used.

Examples of these resins are described in Japanese Patent Publications Nos. 8103/64, 9779/65, 7192/66, 8016/66, 14275/66, 18179/67 12081/68, 28023/69, 14501/70, 24902/70, 13103/71, 22065/72, 22066/72, 22067/72, 22072/72, 22073/72, 28045/72, 28048/72, and 28922/72, U.S. Pat. Nos. 3,144,353, 3,320,090, 3,437,510, 3,597,273, 3,781,210 and 3,781,211, etc.

These binders are employed individually or as mixtures thereof and may further contain additives. A suitable mixing ratio of the ferromagnetic powders and binders is about 10 to about 400 parts by weight, preferably 30 to 200 parts by weight, more preferably 15 to 100 parts by weight, of the binder to 100 parts by weight of the ferromagnetic powder.

In addition to the binders described above and the finely divided ferromagnetic powders, the magnetic recording layer may further contain a dispersing agent, a lubricant, an abrasive, an antistatic agent, etc.

Suitable dispersing agents which can be employed are fatty acids having 12 to 18 carbon atoms (e.g., of the formula $R_5COOH$ wherein $R_5$ represents an alkyl or alkenyl group having 11 to 17 carbon atoms) such as caprylic acid, lauric acid, myristic acid, palmitic acid, stearic acid, oleic acid, elaidic acid, linoleic acid, linolenic acid, stearolic acid, etc.; metallic soaps comprising alkali metals (Li, Na, K, etc.) or alkaline earth metals (Mg, Ca, Ba) of the fatty acids described above; fluorine-containing derivatives of the fatty acid esters described above; amides of the fatty acids described above; polyalkylene oxide alkylphosphoric acid esters; lecithin; trialkyl polyolefinoxy quaternary ammonium salts (wherein the alkyl moieties have 1 to 5 carbon atoms, and the olefins are ethylene, propylene, or the like); and the like. In addition, higher alcohols having 12 or more carbon atoms and the sulfuric acid esters thereof can also be employed. These dispersing agents can be employed in an amount ranging from 0.5 to 20 parts by weight to 100 parts by weight of the binder.

These dispersing agents are specifically described in Japanese Patent Publications Nos. 28369/64, 17945/69, 7441/73, 15001/73, 15002/73, 16363/73 and 4121/75, U.S. Pat. Nos. 3,387,993 and 3,470,021, etc.

The alkylpolysiloxane of the formula (I) in accordance with the present invention does not impair the effects of the dispersing agents even if such is employed in combination with these dispersing agents.

Suitable lubricants which can be employed include electrically conductive finely divided powders such as graphite; etc.; finely divided inorganic powders such as molybdenum disulfide, tungsten disulfide, etc.; finely divided synthetic resin powders such as powders of polyethylenes, polypropylenes, polyethylene-vinyl chloride copolymers, polytetrafluoroethylenes, etc.; α-olefin polymers; unsaturated aliphatic hydrocarbons which are liquid at normal temperature (compounds in which an n-olefin double bond is present at a terminal carbon, having about 15 to about 22 carbon atoms); fatty acid esters obtained from monocarboxylic fatty acids having 12 to 20 carbon atoms and monovalent alcohols having 3 to 12 carbon atoms, etc. These lubricants can be employed in an amount ranging from 0.2 to 20 parts by weight to 100 parts of a binder.

These lubricants are specifically described in Japanese Patent Publications Nos. 18064/66, 23889/68, 40461/71, 15621/72, 18482/72, 28043/72, 32001/72 and 5042/75, U.S. Pat. Nos. 3,470,021, 3,492,235, 3,497,411, 3,523,086, 3,625,760, 3,630,772 and 3,642,539; *IBM Technical Disclosure Bulletin*, vol. 9, No. 7, page 779 (December 1966); *ELEKTRONIK*, 1961, No. 12, page 380, etc.

Particularly preferred effects can be obtained when the alkylpolysiloxanes of the present invention are used in combination with the fatty acids or fatty acid esters described above.

Suitable abrasives which can be employed are those generally used, e.g., fused alumina, silicon carbide, chromium oxide, corrundum, artificial corrundum, diamond, artificial diamond, garnet, emery (main components: corrundum and magnetite), etc. Abrasives which have a Moh's hardness of about 5 or more and an average particle size of about 0.05 to about 5 μm, preferably 0.1 to 2 μm, are generally employed. These abrasives can be employed in an amount of about 0.5 to about 20 parts by weight to 100 parts by weight of the binder.

These abrasives are specifically described in Japanese Patent Publications Nos. 18572/72, 15003/73, 15004/73 (corresponding to U.S. Pat. No. 3,617,378), 39402/74 and 9401/75, U.S. Pat. Nos. 3,007,807, 3,041,196, 3,293,066, 3,630,910 and 3,687,725, British Pat. No. 1,145,349, German Patent (DT-PS) Nos. 853,211 and 1,101,000, etc. The alkylpolysiloxane in accordance with the present invention reduces head abrasion due to the abrasives if such are employed in combination with these abrasives.

Suitable antistatic agents which can be employed are electrically conductive finely divided powders such as carbon black, carbon black graft polymers, etc.; natural surface active agents such as saponin, etc.; nonionic surface active agents such as alkylene oxide type, glycerin type, glycidol type, etc. surface active agents; cationic surface active agents such as higher alkylamines, quaternary ammonium salts, pyridine and other heterocyclic compounds, phosphonium or sulfoniums, etc.; anionic surface active agents containing acidic groups such as carboxylic acid, sulfonic acid, phosphoric acid, sulfuric acid ester, phosphoric acid ester groups, etc.; amphoteric surface active agents such as aminoacids, aminosulfonic acids, sulfuric acid or phosphoric acid esters of aminoalcohols, etc.

The electrically conductive finely divided powders described above can be employed in an amount ranging from about 0.2 to about 20 parts by weight and the surface active agents can be employed in an amount ranging from about 0.1 to about 10 parts by weight, each to 100 parts by weight of the binder.

Some examples of electrically conductive finely divided powders as well as surface active agents which can be employed as antistatic agents are described in Japanese Patent Publications Nos. 22726/71, 24881/72, 26882/72, 15440/73 and 26761/73, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, German Patent Application (OLS) No. 1,942,665, British Pat. Nos. 1,077,317 and 1,198,450, Oda Ryohei, *Kaimen Kasseizai no Gosei to sono Oyo* (*Synthesis of Surface Active Agents and their Application*), Maki Shoten, Tokyo (1964), A. M. Schwartz and J. W. Perry, *Surface Active Agents*, Interscience Publications Inc. (1958), J. P. Sisley, *Encyclopedia of Surface Active Agents*, vol. 2, Chemical Publishing Co. (1964), *Kaimen Kasseizai Binran* (*Handbook of Surface Active Agents*), 6th Edition, Sangyo Tosho K. K. (Dec. 20, 1966), etc.

These surface active agents can be employed individually or in combination. The surface active agents are also employed as antistatic agents and on some occasions, are employed for other purposes, e.g., for dispersing, improving the magnetic properties, and improving lubrication and as coating aids.

The magnetic recording layer of the present invention can be formed by dissolving the components of the composition described above in organic solvents, kneading and dispersing to prepare respective coating solutions, coating the resulting coating solutions onto a non-magnetic support and then drying. Orientation of the ferromagnetic powders in each of the magnetic recording layers can also be performed after coating the magnetic recording layers before drying the magnetic recording layers. Further, treatments to smoothen the surfaces of each of the magnetic recording layers can also be performed after drying.

Suitable materials for the non-magnetic support which can be employed are polyesters such as polyethylene terephthalate, polyethylene-2,6-naphthalate, etc., polyolefins such as polypropylene, etc.; cellulose derivatives such as cellulose triacetate, cellulose diacetate, etc.; synthetic resins such as polycarbonates, polyimides, etc.

Preferred non-magnetic supports are those which have as good surface characteristics as is possible, having a surface roughness of smaller than about $0.4\mu$ when measured by a surface roughness meter [SURFCOM FRM-D100A produced by Tokyo Seimitsu Co. (Talysurf Style)], more preferably smaller than $0.35\mu$.

In addition, the non-magnetic supports can be in any form, e.g., films, tapes, sheets, discs, cards, drums, etc. and a variety of materials can be chosen depending upon the form desired.

A suitable thickness for these non-magnetic supports is generally about 2 to about 50 $\mu$m in the case of films, tapes or sheets, preferably 3 to 25 $\mu$m; in the case of disc or cards, a suitable thickness is about 0.5 to about 10 mm; and in the case of drums, the non-magnetic supports are formed into cylinder-like shapes and the exact shapes are determined depending upon the recorders employed.

Ferromagnetic powders and the binders described above, the alkylpolysiloxanes of the present invention, dispersing agents, lubricants, abrasives, antistatic agents, solvents, and the like are kneaded to produce magnetic coating solutions.

Upon kneading, the ferromagnetic powders and each of the components described above are charged into a kneader, all at the same time or separately in any order. For example, the ferromagnetic powders can be added to solvents already containing dispersing agents and kneading is continued for a fixed period of time to produce a magnetic coating solution, etc.

A variety of kneaders can be employed for knead-dispersion of the magnetic coating solutions. For example, a double-roll mill, a three-roll mill, a ball mill, a pebble mill, a trommel mill, a sand grinder, a Szegvari attritor, a high speed impeller dispersing machine, a high speed stone mill, a high speed impact mill, a disper, a kneader, a high speed mixer, a homogenizer, a ultrasonic dispersing machine, etc. can be used.

Techniques relating to kneading and dispersing are described in T. C. Patton, *Paint Flow and Pigment Dispersion*, John Wiley & Sons (1964). In addition, techniques which can be used are also described in U.S. Pat. Nos. 2,581,414 and 2,855,156.

Methods for coating the magnetic recording layer onto a support which can be utilized include air doctor coating, blade coating, air knife coating, squeeze coating, immersion coating, reverse roll coating, transfer roll coating, gravure coating, kiss coating, cast coating, spray coating, etc. Other methods are also possible and specific descriptions thereof are described in detail in *Coating Kogaku (Coating Technology)*, pages 253 to 277, Asakura Shoten, Tokyo (Mar. 20, 1971).

The magnetic recording member of the present invention is prepared by coating a magnetic recording layer onto a non-magnetic support using the coating methods described above, followed by drying. Further, two to more magnetic recording layers can also be provided in accordance with continuous coating operations by repeating this procedure. In addition, as described in Japanese Patent Publications No. 98803/73 (corresponding to German Patent Application (DT-OS) Nos. 2,309,159), 99233/73 (corresponding to German Patent Publication (DT-AS) No. 2,309,158), etc, two or more magnetic recording layers can be simultaneously provided by simultaneous multilayer coating methods.

Suitable organic solvents employed upon coating which can be used include ketones such as acetone, methyl ethyl ketone, methyl isobutyl ketone, cyclohexanone, etc.; alcohols such as methanol, ethanol, propanol, butanol, etc.; esters such as methyl acetate, ethyl acetate, butyl acetate, ethyl lactate, glycol monoethyl ether acetate, etc.; ethers and glycol ethers such as diethyl ether, glycol dimethyl ether, glycol monoethyl ether, dioxane, etc.; tar type (aromatic hydrocarbons) such as benzene, toluene, xylene, etc.; chlorinated hydrocarbons such as methylene chloride, ethylene chloride, carbon tetrachloride, chloroform, ethylene chlorohydrin, dichlorobenzene, etc.

The magnetic recording layers coated on a support can also be subjected to an orientation treatment of the ferromagnetic powders therein, if desired, and then the formed magnetic recording layers are dried. In addition, as desired, the magnetic recording layers can be subjected to a surface smoothening treatment or cut into desired shapes to prepare the magnetic recording medium of the present invention. Particularly in the present invention, it was found that if the magnetic recording layers were subjected to a surface smoothening treatment, excellent magnetic recording media having a smooth surface and excellent resistance to abrasion can be obtained.

In the orientation treatment, the magnetic field for orientation can be about 50 to about 2000 gauss, either using an alternating or a direct current. The drying temperature for the magnetic recording layers generally ranges from about 50° to about 120° C., preferably 70° to 100° C., more preferably 80° to 90° C.; the flow amount of air for drying is about 1 to about 5 kl/m$^2$, preferably 2 to 3 kl/m$^2$; and the drying time is about 30 seconds to about 10 mins., preferably 1 to 5 mins.

The direction of orientation of the ferromagnetic powders is determined by the end use of the magnetic recording medium. That is, in the case of audio tapes, compact video tapes, memory tapes, etc., the orientation direction is parallel to the length direction of the tapes, and in the case of video tapes for broadcasting, the ferromagnetic powders are oriented at an angle of about 30° to 90° to the length direction of the tapes.

Methods for orientation of ferromagnetic powders are also described in U.S. Pat. Nos. 1,949,840, 2,796,359, 3,001,891, 3,172,776, 3,416,949, 3,473,960 and 3,681,138, Japanese Patent Publications Nos. 3427/57, 28368/64, 23624/65, 13181/66, 13043/73 and 39722/73, etc.

In addition, as described in German Patent Publication (DT-AS) No. 1,190,985, the direction of orientation of an upper magnetic recording layer and a lower magnetic recording layer can also be different.

The surface smoothening treatment of each of the magnetic layers can be performed by calendering after drying, or using a smoothening sheet prior to drying.

In the case of calendering, it is preferred for the calendering to be conducted in accordance with a supercalendering method in which the magnetic recording layers are passed between a metal roll and a cotton roll or a synthetic resin (for example, nylon) roll. Supercalendering is preferably performed under the conditions of a between-roll pressure of about 25 to about 100 kg/cm$^2$, preferably 30 to 70 kg/cm$^2$, at temperatures between about 35° and about 100° C., preferably 40° and 80° C., and at treating speeds of from 5 to 120 m/min. If the temperature and pressure exceed the upper limits thereof, the magnetic recording layers as well as the non-magnetic support are adversely affected. In addition, if the treatment speed is smaller than about 5 m/min., a surface smoothening effect is not obtained, and if the treating speed exceeds about 120 m/min., the treating operation becomes difficult to accomplish.

Suitable surface smoothening treatments are described in U.S. Pat. Nos. 2,688,567, 2,998,325 and 3,783,023, German Patent Application (DT-OS) No. 2,405,222, Japanese Patent Applications (OPI) Nos. 53631/74 and 10337/75, etc.

As explained hereinabove, the alkylpolysiloxanes having a polyoxyalkylene chain in the side chain thereof, represented by the formula (I), as used in the present invention can reduce the coefficient of friction of the surface opposite that on which the magnetic recording layers are coated of a non-magnetic support (i.e., a base surface) merely by the addition of a small amount thereof to the magnetic recording layers, and therefore, it is not necessary to provide a backing layer. The present invention is thus particularly effective for recording media in which the tape running speed is ultra low speed and the tape thickness is thin; as are used in recent high density compact video tapes.

Some of the advantageous effects achieved by the present invention are set forth below.

(1) The coefficient of friction of the base surface of the magnetic tape is decreased.

(2) The coefficient of friction is reduced without additionally providing any backing layer which has a high degree of uneveness on the base surface.

(3) Because of the lack of the necessity for a backing layer, the surface of the magnetic recording layer is kept smooth so that short wavelength signals are not deteriorated and no increase in noise is encountered, and these results are particularly desirable for high density tapes.

(4) The running stability of magnetic tapes is improved.

(5) Jitter or unstable image reproduction when used as a video tape is small.

(6) Scraping of the non-magnetic supports is eleminated or minimized.

(7) Drop out due to repeated use only occurs rarely.

(8) The coefficient of friction does not deteriorate with the passage of time, and the coefficient of friction can be kept constant without any change.

(9) In general, additives are not preferred in magnetic recording layers because a reduction in the Young's modulus occurs if they are used in a large amount. However, since the additives of the present invention are effective by the use of a small amount thereof, a slight reduction in the Young's modulus in the magnetic recording layers occurs and the Young's modulus is maintained at $1 \times 10^{10}$ dyne/cm$^2$ or higher. As a result, thinner magnetic tapes can be produced.

It is believed that the effects achieved by the present invention occur because the ionic group which renders the alkylpolysiloxane water-soluble (substituent Z) is substituted on the hydrophilic group of the alkylpolysiloxane.

The present invention is further explained more specifically with reference to the following examples and comparison examples. It will be understood by one skilled in the art that the compositions, ratios, operation orders, etc. can be modified without departing from the spirit of the present invention.

Accordingly, the present invention is not to be construed as being limited to the examples given hereinbelow.

In the examples and the comparison examples below, all parts, percents, ratio and the like are by weight, unless otherwise indicated.

EXAMPLE 1

|  | parts |
|---|---|
| Co-containing Berthollide Iron Oxide | 100 |
| Co (4.0 atomic %/metallic iron)- containing FeO$_{1.4}$; Hc: 660 Oe; Acicular ratio: 7/1; Average particle size: 0.5 μm | |
| Nitrocellulose | 25 |
| Triisocyanate | 7 |
| (Desmodur L-75 tradename, made by Bayer A.G., 75 wt % ethyl acetate solution of the reaction product of 3 mols of tolylene diisocyanate and 1 mol of trimethylol propane; molecular weight: ca. 760) | |
| Dibutyl Phthalate | 3 |
| Amyl Stearate | 1 |
| Lubricant (as shown in Table 1) | 0 to 10 |
| Butyl Acetate | 300 |

The composition described above was kneaded for 8 hrs. using a sand mill and dispersed to prepare a coating solution for a magnetic recording layer. The resulting coating solution was coated onto a polyethylene terephthalate film having a surface roughness of 0.33μ and a thickness of 14 μm, followed by orientation thereof in the length direction with a solenoid magnet (2000 Gauss). After drying at a temperature of 100° C. at a speed of 80 m/min., calendering was conducted at a temperature of 50° C., a pressure of 50 kg/cm$^2$, and a speed of 40 m/min. to obtain a wide magnetic film. The so obtained magnetic film was slit into a ½ inch width to obtain a magnetic tape. The magnetic tape was inserted into a cassette for ½ inch VTR (VHS Standard, made by Nippon Victor K. K.) to produce samples (Nos. 1 to 8). The kinds of lubricants, the amounts added thereof, the surface roughness of the back surface of the support and measurement results are shown in Table 1 below.

Table 1

| Sample No. | Lubricant | Amount Added (wt %) | Surface Roughness of Back Surface of Support (μm) | Coefficient of Friction | (1) Jitter | (2) Running Stability | (3) Video Color Noise (dB) | (4) Drop Out (number /min.) | Young's Modulus of Magnetic Recording Layer (dyne/cm²) |
|---|---|---|---|---|---|---|---|---|---|
| 1 | — | 0 | 0.33 | 0.42 | 2 | 2 | 0 | 120 | $6 \times 10^{10}$ |
| 2 | I-1 | 0.01 | 0.33 | 0.38 | 3 | 3 | 0 | 80 | $6 \times 10^{10}$ |
| 3 | I-1 | 0.1 | 0.33 | 0.28 | 5 | 5 | 0 | 20 | $5.5 \times 10^{10}$ |
| 4 | I-1 | 1.0 | 0.33 | 0.25 | 5 | 5 | 0 | 15 | $5 \times 10^{10}$ |
| 5 | I-1 | 2.0 | 0.33 | 0.25 | 4 | 5 | 0 | 18 | $2 \times 10^{10}$ |
| 6 | I-1 | 3.0 | 0.33 | 0.25 | 3 | 5 | 0 | 21 | $1 \times 10^{10}$ |
| 7 | I-1 | 5.0 | 0.33 | 0.25 | 2 | 5 | 0 | 20 | $8 \times 10^{9}$ |
| 8 | I-1 | 10.0 | 0.33 | at least 0.45 | —(5) | 2 | —(5) | —(5) | $5 \times 10^{9}$ |

Evaluation: Video cassette HR 3300 (Nippon Victor K.K., for ½ cassette, VHS Standard) was used as the VTR.
(1): Jitter - Stair step signals were recorded and reproduced, whereby a 1–5 kHz frequency signal to the horizontal direction (scanning sideways) on rolling motion on a monitor TV picture was visually evaluated and compared for each sample. The evaluation was using the following scale:
1 : Rolling motion was very large
2 : Rolling motion was large
3 : Rolling motion was somewhat large
4 : Rolling motion slightly occurred
5 : No rolling motion
(2): Running Stability - Similar to the above, the rolling motion of a below 1 kHz frequency signal was visually evaluated and compared. The evaluation on a scale of 1 to 5 was the same as above.
(3): Video · Color Noise (dB) - Using a video · color noise meter (made by Shibasoku K.K., Model 925 C), the noise obtained using a 16 UIA plug-in unit was measured.
(4): Drop Out (number/min) - Relative speed of tape to video head: 6 m/sec. Head track width: 60 μm Recorded signal: A signal of 4.5 MHz was recorded and reproduced 25 times. Thereafter, drop out (1.5 μsec., 18 dB) was measured with a drop out counter (made by Nippon Jido Seigyo K.K., NJS-IDC 2 Model).
(5): Sample 8 soiled the magnetic head, and jitter, video · color noise and drop out could not be evaluated.

EXAMPLE 2

In a manner similar to Example 1, magnetic tapes having a ½ inch width for video use were prepared (Sample Nos. 1, 4 and 9 to 14) using the compositions of Sample No. 1 (no lubricant) and No. 4 (Compound I-1 was employed in an amount of 1 part by weight) except that four kinds of polyethylene terephthalate supports of a thickness of 14 μm having a surface roughness of 0.56 μm, 0.33 μm, 0.25 μm and 0.18 μm were employed as non-magnetic flexible supports. In a manner similar to Example 1, the respective characteristics were evaluated and the results of which are shown in Table 2 below.

lubricants used are shown in Table 3 below. The results obtained are shown in Table 3 below.
Sample No. 15: Compound I-2 of the formula (I)
Sample No. 16: Compound I-3 of the formula (I)
Sample No. 17: Compound I-4 of the formula (I)
Sample No. 18: Compound I-5 of the formula (I)
Sample No. 19: Compound A (dimethyl polysiloxane)

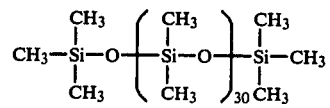

Sample No. 20: Compound B

Table 2

| Sample No. | Lubricant | Amount Added (wt %) | Roughness on Back Surface of Support (μm) | Coefficient of Friction | (1) Jitter | (2) Running Stability | (3) Video · Color Noise (dB) | (4) Drop Out (number/min) | Young's Modulus of Magnetic Recording Layer (dyne/cm²) |
|---|---|---|---|---|---|---|---|---|---|
| 9 | — | 0 | 0.56 | 0.30 | 4 | 5 | +3.5 | 30 | $6 \times 10^{10}$ |
| 1 | — | 0 | 0.33 | 0.42 | 2 | 2 | 0.0 | 120 | $6 \times 10^{10}$ |
| 10 | — | 0 | 0.25 | 0.45 | 3 | 3 | −1.5 | 90 | $6 \times 10^{10}$ |
| 11 | — | 0 | 0.18 | at least 0.45 | 1 | 1 | −2.0 | —(5) | $6 \times 10^{10}$ |
| 12 | I-1 | 1.0 | 0.56 | 0.25 | 5 | 5 | +3.0 | 28 | $5 \times 10^{10}$ |
| 4 | I-1 | 1.0 | 0.33 | 0.25 | 5 | 5 | 0.0 | 15 | $5 \times 10^{10}$ |
| 13 | I-1 | 1.0 | 0.25 | 0.26 | 5 | 5 | −1.5 | 28 | $5 \times 10^{10}$ |
| 14 | I-1 | 1.0 | 0.18 | 0.30 | 4 | 4 | −2.0 | 31 | $5 \times 10^{10}$ |

(1)–(5) See Table 1.

EXAMPLE 3

In a similar manner to Example 1, ½ inch wide magnetic tapes for video use were prepared according to Sample No. 4 of Example 1 except that the kinds of lubricants were changed (Sample Nos. 15 to 22). The

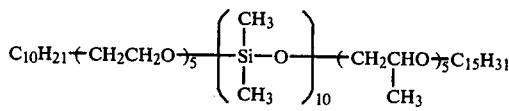

-continued

Sample No. 21: Compound C

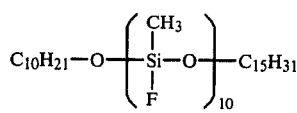

Table 3

| Sample No. | Lubricant | Amount Added (wt %) | Roughness of Back Surface of Support (μm) | Coefficient of Friction | (1) Jitter | (2) Running Stability | (3) Video · Color Noise (dB) | (4) Magnetic Drop Out (number/min.) | Young's Modulus of Recording Layer (dyne/cm²) |
|---|---|---|---|---|---|---|---|---|---|
| 1 | — | 0 | 0.33 | 0.42 | 1 | 1 | 0.0 | 120 | $6 \times 10^{10}$ |
| 4 | I - 1 | 1.0 | 0.33 | 0.25 | 5 | 5 | 0.0 | 15 | $5 \times 10^{10}$ |
| 15 | I - 2 | 1.0 | 0.33 | 0.28 | 5 | 5 | 0.0 | 30 | $5 \times 10^{10}$ |
| 16 | I - 3 | 1.0 | 0.33 | 0.26 | 5 | 5 | 0.0 | 26 | $5.5 \times 10^{10}$ |
| 17 | I - 4 | 1.0 | 0.33 | 0.25 | 5 | 5 | 0.0 | 13 | $5 \times 10^{10}$ |
| 18 | I - 5 | 1.0 | 0.33 | 0.29 | 4 | 5 | 0.0 | 28 | $5 \times 10^{10}$ |
| 19 | Compound A | 1.0 | 0.33 | 0.33 | 2 | 2 | 0.0 | 80 | $5 \times 10^{10}$ |
| 20 | Compound B | 1.0 | 0.33 | 0.40 | 1 | 1 | 0.0 | 110 | $5 \times 10^{10}$ |
| 21 | Compound C | 1.0 | 0.33 | 0.39 | 1 | 1 | 0.0 | 100 | $5 \times 10^{10}$ |

(1)–(4) See Table 1.

EXAMPLE 4

| | parts |
|---|---|
| Co-containing Berthollide Iron Oxide (see Table 4) | 100 |
| Nitrocellulose | 25 |
| Triisocyanate (as described in Example 1) | 7 |
| Dibutyl Phthalate | 3 |
| Amyl Stearate | 1 |
| Additive (as shown in Table 4) | As shown in Table 4 |
| Butyl Acetate | 300 |

Using the composition described above, ½ inch wide magnetic tapes for video use having different Young's moduli were prepared in a manner similar to Example 1 except that the particle size and the acicular ratio of the finely divided ferromagnetic powders were changed (Sample Nos. 22 to 27). The characteristics of the finely divided ferromagnetic powders used and the additives are shown in Table 4 below.

Table 4

| | Co-containing Berthollide Iron Oxide | | | | | Additive | |
|---|---|---|---|---|---|---|---|
| Sample No. | Amount of Co (atomic %) | Oxidation Degree | Average Particle Size (μm) | Acicular Ratio | Hc (Oe) | Kind | Amount Added (wt %) |
| 22 | 4.0 | FeO$_{1.4}$ | 0.5 | 7:1 | 660 | — | 0 |
| 23 | 4.0 | FeO$_{1.4}$ | 0.5 | 7:1 | 660 | I - 1 | 1.0 |
| 24 | 4.2 | FeO$_{1.4}$ | 0.4 | 3:1 | 660 | — | 0 |
| 25 | 4.2 | FeO$_{1.4}$ | 0.4 | 3:1 | 660 | I - 1 | 1.0 |
| 26 | 4.2 | FeO$_{1.4}$ | 0.4 | 3:1 | 660 | — | 0 |
| 27 | 4.2 | FeO$_{1.4}$ | 0.4 | 3:1 | 660 | I - 1 carbon black | 1.0 20.0 |

The results of evaluation of each of the samples are shown in Table 5 below.

Table 5

| Sample No. | Roughness of Back Surface of Support (μm) | Coefficient of Friction | (1) Jitter | (2) Running Stability | (3) Video · Color Noise (dB) | (4) Drop Out (number/min) | Young's Modulus of Magnetic Recording Layer (dyne/cm²) |
|---|---|---|---|---|---|---|---|
| 22 | 0.33 | 0.38 | 2 | 3 | 0.0 | 95 | $2 \times 10^{10}$ |
| 23 | 0.33 | 0.23 | 4 | 5 | 0.0 | 28 | $1.8 \times 10^{10}$ |
| 24 | 0.33 | 0.41 | 2 | 2 | 0.0 | 80 | $8 \times 10^{9}$ |
| 25 | 0.33 | 0.25 | 2 | 4 | 0.0 | 30 | $7 \times 10^{9}$ |
| 26 | 0.33 | 0.43 | 1 | 2 | 0.0 | 90 | $3 \times 10^{9}$ |
| 27 | 0.33 | 0.27 | 1 | 4 | 0.0 | 31 | $2.5 \times 10^{9}$ |

(1) to (4) See Table 1.

The effects of the present invention were confirmed from the results of Examples 1 through 4.

(1) The lubricants used in the present invention represented by formula (I) are extremely effective for reducing the coefficient of friction of the base surface of a magnetic tape (Examples 1 to 4).

(2) The effect described above is particularly marked when a non-magnetic support having a small surface roughness (below 0.35 μm) is employed. There is a slight reduction in coefficient of friction in using a non-magnetic support having poor surface property, but it is unsuitable for high density video tape use because video color noise is increased (Example 2).

(3) Jitter becomes worse with a Young's modulus below $1 \times 10^{10}$ dyne/cm² (Examples 1 and 4).

(4) Tapes having a high coefficient of friction show serious drop out after running 25 times. This is also based upon the occurrence of scraping due to the surface of the base. The coefficient of friction of the tapes in accordance with the present invention is reduced so that running stability was improved (Examples 1 to 4).

(5) The tapes in accordance with the present invention have low jitter, a low coefficient of friction and possess a high Young's modulus (Examples 1 through 4).

(6) It was found that when the amount of lubricant added is increased, the Young's modulus of the magnetic recording layer tends to decrease and becomes smaller than $1 \times 10^{10}$ dyne/cm$^2$ and jitter is markedly increased. In addition, when the amount added becomes extremely large, the lubricants exude overly onto the tape surface to cause tackiness so that the magnetic head is soiled, making it impossible to use such a tape (Examples 1 and 2).

While the invention has been described in detail and with reference to specific embodiments thereof, it will be apparent to one skilled in the art that various changes and modifications can be made therein without departing from the spirit and scope thereof.

What is claimed is:

1. A magnetic recording medium having a running speed below 5 cm/sec comprising a non-magnetic support having thereon a magnetic recording layer comprising finely divided ferromagnetic powders in a binder, wherein (1) the magnetic recording layer contains about 0.1 to about 5% by weight based on the weight of said finely divided ferromagnetic powder of at least one alkylpolysiloxane having a hydrophilic group in the side chain thereof, represented by the formula (I) below

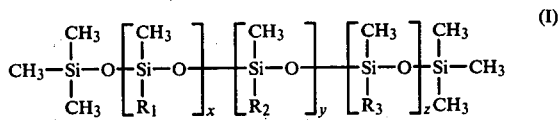

wherein $R_1$ and $R_2$, which may be the same or different, each represents —CH$_3$ or

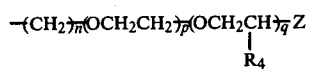

provided that $R_1$ and $R_2$ are not simultaneously —CH$_3$; $R_3$ represents —CH$_3$ or the aliphatic chain having 10 to 18 carbon atoms of a saturated or unsaturated fatty acid; $R_4$ represents —H or —CH$_3$; Z represents an ionic group, which renders the alkylpolysiloxane water-soluble, selected from the group consisting of —OSO$_3$Na, —COOR$_5$ wherein $R_5$ is H, Na or K, and

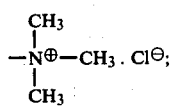

x represents a number of from 3 to 50; y represents a number of from 2 to 50; z represents 0 or a number of from 1 to 10; x+y+z is a number of from 5 to 100; n is 0 or a number of from 1 to 5; p is 0 or a number of from 1 to 50; and q is 0 or a number of from 1 to 50, and (2) the magentic recording layer has a Young's modulus of at least $1 \times 10^{10}$ dyne/cm$^2$.

2. The magnetic recording layer of claim 1, wherein said aliphatic chain having 10 to 18 carbon atoms for $R_3$ is a decyl group, an undecyl group, a dodecyl group, a tridecyl group, a tetradecyl group, a pentadecyl group, a hexadecyl group, a heptadecyl group, an 8-undecenyl group, a 3-tridecenyl group, a 4-tridecenyl group, an 8-pentadecenyl group, a 5-heptadecenyl group, an 8-cis-heptadecenyl group, an 8-trans-heptadecenyl group, a 10-heptadecenyl group, an 8,11-heptadecadienyl group, an 8,10,12-heptadecatrienyl group, an 8,11,14-heptadecatrienyl group or an 8,10,12,14-heptadecatetraenyl group.

3. The magnetic recording medium of claim 1, wherein x is a number of from 5 to 30; y is a number of from 4 to 30; z is 0 or a number of 1 to 5; x+y+z is a number of from 5 to 50; n is 0 or a number of 1 to 3; p is a number of from 1 to 20; and q is a number of from 1 to 10.

4. The magnetic recording member of claim 1, wherein said alkylpolysiloxane is:

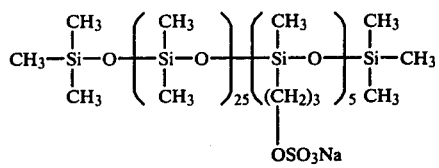

5. The magnetic recording medium of claim 1, wherein said alkylpolysiloxane is:

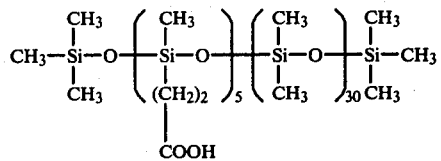

6. The magnetic recording medium of claim 1, wherein said alkylpolysiloxane is

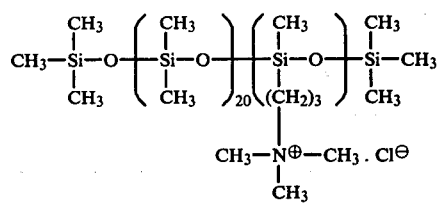

7. The magnetic recording medium of claim 1, wherein said alkylpolysiloxane is:

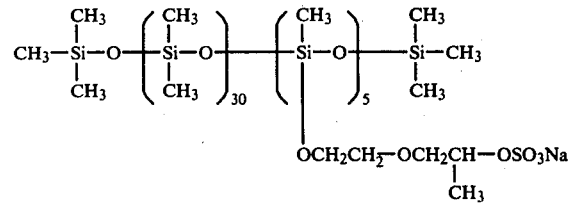

8. The magnetic recording medium of claim 1, wherein said alkylpolysiloxane is:

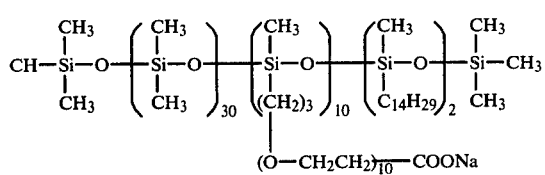

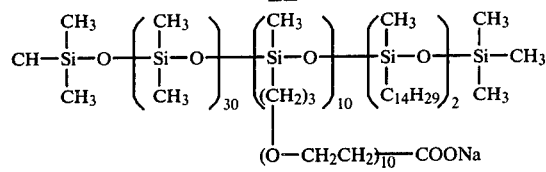

9. The magnetic recording medium of claim 1, wherein said alkylpolysiloxane is present in said magnetic recording layer in an amount of 0.1 to 2% by weight, based on the weight of said finely divided ferromagnetic powders.

* * * * *

9. The magnetic recording medium of claim 1, wherein said alkylpolysiloxane is present in said magnetic recording layer in an amount of 0.1 to 2% by weight, based on the weight of said finely divided ferromagnetic powders.

* * * * *